United States Patent
Yaguchi et al.

(10) Patent No.: US 7,118,803 B1
(45) Date of Patent: Oct. 10, 2006

(54) STRING-LIKE SEALING MATERIAL (75) Inventors: Shigeyuki Yaguchi, Tochigi (JP); Yoshio Kishimoto, Tokyo (JP)

(73) Assignees: Honda Motor Co., Ltd., Tokyo (JP); Nichiban Co., Ltd., Tokyo (JP)

( * ) Notice: Subject to any disclaimer, the term of this patent is extended or adjusted under 35 U.S.C. 154(b) by 0 days.

(21) Appl. No.: 09/958,004

(22) PCT Filed: Feb. 2, 2000

(86) PCT No.: PCT/JP00/00568

§ 371 (c)(1),
(2), (4) Date: Oct. 1, 2001

(87) PCT Pub. No.: WO01/57154

PCT Pub. Date: Aug. 9, 2001

(51) Int. Cl.
*B32B 1/00* (2006.01)

(52) U.S. Cl. ............................ 428/368; 428/373

(58) Field of Classification Search ............. 428/364; 524/451, 507; 525/131
See application file for complete search history.

(56) References Cited

U.S. PATENT DOCUMENTS

| | | | | | |
|---|---|---|---|---|---|
| 3,250,663 | A | * | 5/1966 | Sharp et al. | 428/139 |
| 3,412,354 | A | * | 11/1968 | Sattler | 336/205 |
| 3,974,132 | A | * | 8/1976 | Valdiserri | 524/87 |
| 4,643,863 | A | | 2/1987 | Martini | 264/219 |
| 5,326,605 | A | * | 7/1994 | Ono et al. | 428/41.2 |
| 5,470,657 | A | * | 11/1995 | Hayami | 428/373 |

FOREIGN PATENT DOCUMENTS

| | | | | |
|---|---|---|---|---|
| EP | 141065 | A | * | 5/1985 |
| EP | 0313071 | | | 4/1989 |
| JP | 52-39654 | A | * | 10/1977 |
| JP | 5239654 | | | 11/1977 |
| JP | 56135584 | | | 10/1981 |
| JP | 56135584 | A | * | 10/1981 |
| JP | 62-179586 | A | * | 8/1987 |
| JP | 2739152 | | | 1/1988 |
| JP | 1-278594 | A | * | 11/1989 |
| JP | 2-226663 | A | * | 9/1990 |
| JP | 2-279710 | A | * | 11/1990 |
| JP | 3007776 | | | 1/1991 |
| JP | 3-277682 | A | * | 9/1991 |
| JP | 430608 | | | 3/1992 |
| JP | 6145647 | | | 5/1994 |
| JP | 200044929 | | | 2/2000 |

\* cited by examiner

*Primary Examiner*—Robert Sellers
(74) *Attorney, Agent, or Firm*—Dinsmore & Shohl LLP (57) ABSTRACT

A string-like sealing material characterized in that (1) the string-like sealing material is a string-like body (a) obtained by forming a thermosetting resin composition comprising a synthetic resin and a heat-curing agent or a string-like composite structure (b) obtained by arranging a dimension-stabilizing aid along the lengthwise direction of the string-like body (a), (2) the elongation percentage thereof is within 10% as measured by applying a load to become stress of 5 $N/cm^2$ per unit sectional area at 23° C. for 5 minutes to the string-like sealing material in the lengthwise direction thereof, and (3) the string-like body (a) has high shape-retaining ability at normal temperature (5 to 35° C.), but exhibits good melt flowability upon its heat curing.

11 Claims, 4 Drawing Sheets

STRING-LIKE SEALING MATERIAL

TECHNICAL FIELD

The present invention relates to a string-like sealing material obtained by forming a thermosetting resin composition, and more particularly to a string-like sealing material which is excellent in handling property and can exhibit melt flowability upon its heat curing to be completely filled even into a narrow and deep groove part such as a V-shaped groove so as to form a sealed part in good shape. The string-like sealing material according to the present invention can be suitably applied to a wide variety of fields such as automobiles•vehicles, ships, aircraft, buildings, civil engineering, and various kinds of machines and apparatus because it is excellent in heat resistance, weather resistance, rust proofness and sealing property, and can form a sealed part in good shape.

BACKGROUND ART

Sealing materials have heretofore been used and filled into joints and clearances for the purpose of keeping watertightness, airtightness or the like. For example, in the field of automobiles•vehicles, sealing materials are applied to individual sites upon assembly of parts, assembly of bodies, coating, assembly of equipments or fittings, etc., so as to prevent air, water, dust and/or the like from penetrating into body interiors. The sealing materials include shapeless sealing materials such as paste and shaped sealing materials such as rubber gasket.

Among these, the pasty sealing material can be applied to an application site by means of a sealing gun by hand or robot, and so it is excellent in productivity and commonly used in the field of automobiles•vehicles, and the like. However, when the application site is a deep and narrow groove part such as a V-shaped groove, the application has been difficult because the sealing gun has not been able to be put therein. When a sealing material having a high viscosity is used, the sealing material cannot be filled up to the bottom of the V-shaped groove part, which cause a problem on watertightness and airtightness. Even when the application site is a shallow V-shaped groove part, it is difficult for a sealing material to fill the groove part up to the bottom thereof when the sealing material has a high viscosity. When a sealing material having a low viscosity on the other hand, sag is caused, and the sealing material run out to other portions than the application site. Further, when the pasty sealing material was applied to an application site of which good appearance is required, the form of the sealed part has had to be arranged by hand after the application.

As the shapeless sealing materials, there have been known many materials each having a composition comprising a resin or polymer as a main component, and containing a plasticizer, a softening agent, a filler, a reinforcing agent, a curing agent, etc., including the pasty sealing materials. However, most of them are in the form of a paste solution or emulsion. In a sealing material of the reaction-curing type, a liquid polymer is used as a main component. Many of these sealing materials include the above-described problems attendant on the pasty sealing materials. A two-component sealing material of the reaction-curing type, in which a curing agent is mixed upon its use, involves problems that a mixing operation is complicated, and a curing speed is fast, and the curing speed varies according to environmental temperatures.

Rubber gaskets and the like among the shaped sealing materials are suitable for use in arranging at a joint surface between structure members, but unstable for use in filling in a narrow groove part to seal it. The shaped sealing materials include sealing materials formed into sheets, strings or the like. Since many of them are used by attaching each of them to an application site and applying a load thereto or pressing it, however, it is difficult to completely fill it into a groove part in a narrow and deep form such as a V-shaped groove. An adhesive tape for sealing equipped with a support is further difficult to be applied to an application site having a complicated form, a deep groove part or the like because of the thickness or hardness of the support.

The conventional string-like sealing materials have disadvantage that they are partially elongated during handling to be thinned, broken or loosened. Such a string-like sealing material is not only poor in handling property, but also difficult to form a sealed part with good appearance, and also has an possibility that a problem may arise as to watertightness and airtightness. Japanese Patent Publication No. 39654/1977 has proposed a sealing material obtained by winding a sealing material layer composed mainly of tacky synthetic butyl rubber around an elastic resilient stretch-resistant body in the form of string into a string-like member for the purpose of improving the defects of such string-like sealing materials. In this string-like sealing material, the sealing material layer composed mainly of tacky synthetic butyl rubber is formed around a spongy or hollow stretch-resistant body. The sealing material is applied to an application site by applying a load thereto or pressing it to achieve sealing making good use of the restoring force of the stretch-resistant body and the tack of the sealing material layer. This publication describes that the use of the sealing material permits forming a firm sealing relation that it is well compatible with irregular rough surfaces such as concrete and cut surfaces of wood and penetrates into the tissue thereof by the restoring force to be airtightly tack-bonded thereto by a mere pressing operation without need of a fusion-bonding operation under heat. Even when this sealing material is used by pressing it, however, a narrow and deep groove part such as a V-shaped groove, or the like cannot be completely filled with the sealing material.

The present inventors proposed a reactive adhesive composition cured by heating in Japanese Patent registration No. 2739152. This reactive adhesive composition is a composition comprising a saturated polyester resin which is solid at normal temperature, a (meth)acrylurethane oligomer having a viscosity of at least 100 cps at normal temperature and a heat-curing catalyst, and is useful as a thick-applied coating, sealing material, pate or the like. This reactive adhesive composition does not have flowability and has moderate tackiness and cohesive force at normal temperature and thus can be used in any form such as string, pellet, sheet or block.

However, the reactive adhesive composition specifically disclosed in this patent publication is cured under curing conditions as its form is substantially retained. For example, it is disclosed that the reactive adhesive composition formed into a sheet is cured in that state without melting and flowing under curing conditions though its corners are rounded by melting. The use of such a reactive adhesive composition makes it difficult to completely fill a narrow and deep groove part such as a V-shaped groove with the adhesive composition

DISCLOSURE OF THE INVENTION

It is an object of the present invention to provide a sealing material which is excellent in handling property, can be completely filled even into a narrow and deep groove part such as a V-shaped groove by heating it, is excellent in heat resistance, weather resistance, rust proofness and sealing property, and can form a sealed part in good shape.

The present inventors researched repeatedly as to reactive adhesive compositions, thus resulting in conception of a thermosetting resin composition, which can be melted and formed in a formed product solid at normal temperature and exhibits good melt flowability under heat-curing conditions, by varying, for example, the kinds and mixing proportions of a thermosetting resin and a thermoplastic resin, the kinds and mixing proportions of various kinds of additives such as a heat-curing agent and a filler, etc. A formed product obtained by forming this thermosetting resin composition has good shape-retaining ability at normal temperature, but melt-flows and cures under heat.

When this thermosetting resin composition was used to form a string-like sealing material, and the resultant string-like sealing material is applied to filling of a groove part of a V-shaped coated steel plate, the material melt-flowed upon heat curing to completely fill the groove part up to the bottom thereof and cure. However, such a thermosetting resin composition has involved a problem that the surface profile of the sealing material cured is disordered, and moreover a part of the thermosetting resin composition runs out of an end of the V-shaped groove part to form a cured flash area. More specifically, this thermosetting resin composition has involved a problem that the resin composition itself is generally too low in melt viscosity upon heat curing and tends to form sag, and so it runs out to other places than the application site to cure when it is used as a sealing material. In addition, this string-like sealing material had disadvantage that it is partially elongated during handling to be thinned, broken or loosened.

The present inventors have thus researched with a view toward solving such disadvantage, thus resulting in conception of a string-like composite structure obtained by forming a thermosetting resin composition comprising a synthetic resin and a heat-curing agent into a string-like body and arranging a dimension-stabilizing aid on the surface or in the interior thereof along the lengthwise direction of the string-like body. The string-like sealing material composed of this composite structure is excellent in dimensional stability and does not cause such disadvantage as described above upon handling. In addition, when the string-like sealing material composed of this composite structure is arranged at an application site such as a narrow and deep groove part like a V-shaped groove and heated, the thermosetting resin composition melt-flows throughout the bottom of the groove part and cures, but does not run out to other places than the application site, and the appearance of the sealed part after curing is also good.

The present inventors has paid attention to the importance of the dimensional stability of such a string-like sealing material and proceeded with a further research. As a result, it has been found that even a string-like sealing material composed of a string-like body alone obtained by forming a thermosetting resin composition comprising a synthetic resin and a heat-curing agent is excellent in handling property, does not run out to other places than an application site in cooperation with its heat-curing property, and is good in appearance of the sealed part after curing so far as it has good shape-retaining ability at normal temperature and melt flowability upon heat curing and moreover is small in the degree of deformation (elongation) against external force in the lengthwise direction thereof.

The degree of deformation (elongation) against external force in the lengthwise direction of the string-like sealing material may be applied, as an index to dimensional stability, to the string-like body obtained by forming a thermosetting resin composition comprising a synthetic resin and a heat-curing agent and the string-like composite structure obtained by arranging a dimension-stabilizing aid on the surface of the string-like body along the lengthwise direction thereof. The surface tackiness of the string-like sealing material (string-like body) can be controlled by selecting the composition of the thermosetting resin composition or conducting a non-tack treatment, whereby the workability of the sealing material can be improved. The present invention has been led to completion on the basis of these findings.

According to the present invention, there is thus provided a string-like sealing material characterized in that (1) the string-like sealing material is a string-like body (a) obtained by forming a thermosetting resin composition comprising a synthetic resin and a heat-curing agent or a string-like composite structure (b) obtained by arranging a dimension-stabilizing aid along the lengthwise direction of the string-like body (a), (2) the elongation percentage thereof is within 10% as measured by applying a load to become stress of 5 N/cm$^2$ per unit sectional area at 23° C. for 5 minutes to the string-like sealing material in the lengthwise direction thereof, and (3) the string-like body (a) has high shape-retaining ability at normal temperature (5 to 35° C.), but exhibits good melt flowability upon its heat curing.

According to the present invention, there is also provided a sealing process, comprising placing a string-like sealing material composed of a string-like body (a) obtained by forming a thermosetting resin composition comprising a synthetic resin and a heat-curing agent or a string-like composite structure (b) obtained by arranging a dimension-stabilizing aid along the lengthwise direction of the string-like body (a) on an application site and heating the string-like sealing material, thereby causing the thermosetting resin composition forming the string-like sealing material to melt-flow and cure.

BEST MODE FOR CARRYING OUT THE INVENTION

The string-like sealing material according to the present invention is a string-like body (a) obtained by forming a thermosetting resin composition comprising a synthetic resin and a heat-curing agent or a string-like composite structure (b) obtained by arranging a dimension-stabilizing aid along the lengthwise direction of the string-like body (a). The string-like composite structure is roughly divided into a string-like composite structure (b1) with the dimension-stabilizing aid arranged in the interior of the string-like body along the lengthwise direction thereof and a string-like composite structure (b2) with the dimension-stabilizing aid arranged on the surface of the string-like body along the lengthwise direction thereof. The dimension-stabilizing aid is preferably a linear material such as a copper wire or rubber string. The linear material may be generally arranged by one material on the surface or in the interior of the string-like body. However, a plurality of linear materials may be arranged if desired.

These string-like sealing materials will be described with reference to the drawings.

Figure 1:
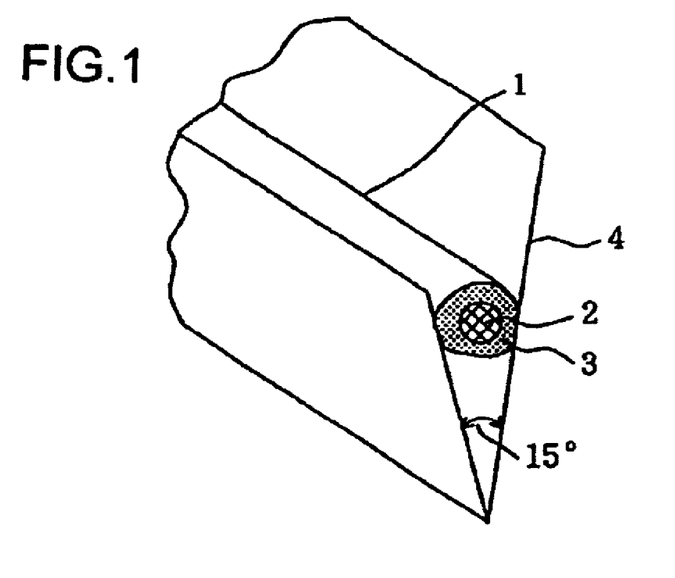
FIG. 1 schematically illustrates a specific example of a string-like sealing material composed of a string-like composite structure according to the present invention and a state of the string-like sealing material applied to a V-shaped groove before heat curing.

FIG. 1 illustrates a specific example of a string-like sealing material composed of the string-like composite structure (b1) with the dimension-stabilizing aid arranged in the interior of the string-like body (a) along the lengthwise direction thereof. More specifically, the dimension-stabilizing aid 2 is integrally composited in the interior of a string-like body 3 formed from the thermosetting resin composition along the lengthwise direction thereof.

The thermosetting resin composition used in the present invention is solid at normal temperature (5 to 35° C.) and melt-flows under heat to cure. This thermosetting resin composition is softened under heat, deformed by applying external force thereto and exhibits a nature that its shape is retained by removing the heat or external force. However, this thermosetting resin composition melt-flows and cures when it is heated to a heat-curing temperature. The string-like body 3 formed from the thermosetting resin composition is solid at normal temperature and exhibits no flowability, and thus has good shape-retaining ability.

Figure 2:
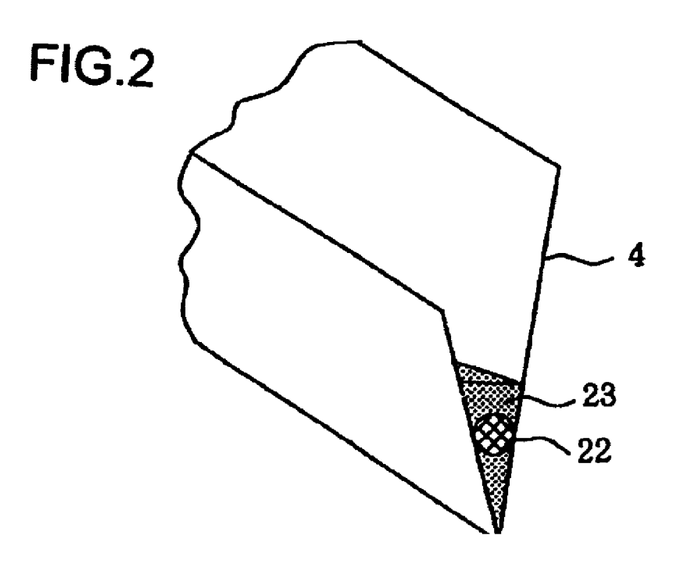
FIG. 2 schematically illustrates a state that the string-like sealing material shown in FIG. 1 has been applied to a V-shaped groove and heat-cured.

The string-like sealing material 1 composed of this composite structure is excellent in dimensional stability and does not cause disadvantage that it is partially elongated during handling to be thinned, broken or loosened, since the dimension-stabilizing aid 2 is composited in the interior of the string-like body 3. When the string-like sealing material 1 is placed at an upper part of a groove of a V-shaped coated steel plate 4 having an angle of 15°, a narrow clearance is produced between the bottom of the V-shaped groove and the sealing material at normal temperature as illustrated in FIG. 1. When the string-like sealing material is heated to a heat-curing temperature of the thermosetting resin composition forming the string-like body 3, the thermosetting resin composition 23 melt-flows to completely fill the bottom of the groove in the V-shaped coated steel plate 4 as illustrated in FIG. 2. When the dimension-stabilizing aid 22 is formed with a material not melted or decomposed upon the heat curing, it moves downward according to the melt flowing of the thermosetting resin composition and reaches the place of the allowed width of the V-shaped groove part.

Since the thermosetting resin composition is heated to the heat-curing temperature, it heat-cures at the same time as the melt flowing or after that. As illustrated in FIG. 2, the thermosetting resin composition located under the dimension-stabilizing aid 22 cures in the form of the groove bottom, and the thermosetting resin composition located on the dimension-stabilizing aid 22 forms a substantially flat cured seal area. Accordingly, the necessity of arranging the form of the sealed part by hand after the application is lightened. Even when the thermosetting resin composition melt-flows upon the heat curing, the thermosetting resin composition neither sags nor runs out to portions free of the dimension-stabilizing aid because the dimension-stabilizing aid is present, and the thermosetting resin composition moves together with the dimension-stabilizing aid.

Since the string-like sealing material composed of the string-like composite structure (b1) is excellent in dimensional stability at normal temperature so far as the elongation percentage thereof is within 10% as measured by applying a load to become stress of 5 N/cm$^2$ per unit sectional area at 23° C. for 5 minutes to the string-like sealing material in the lengthwise direction thereof, the dimensional stability of the string-like body itself forming the string-like composite structure (b1) may be insufficient. In other words, the elongation percentage of the string-like body may not be always within 10% as measured by applying a load to become stress of 5 N/cm$^2$ per unit sectional area at 23° C. for 5 minutes to the string-like body in the lengthwise direction thereof.

Figure 3:
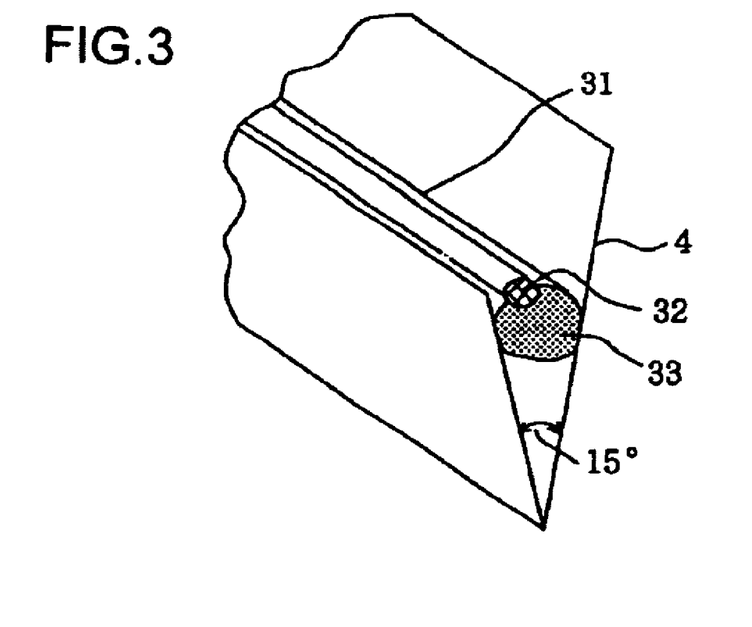
FIG. 3 schematically illustrates another specific example of a string-like sealing material composed of a string-like composite structure according to the present invention and a state of the string-like sealing material applied to a V-shaped groove before heat curing.
Figure 4:
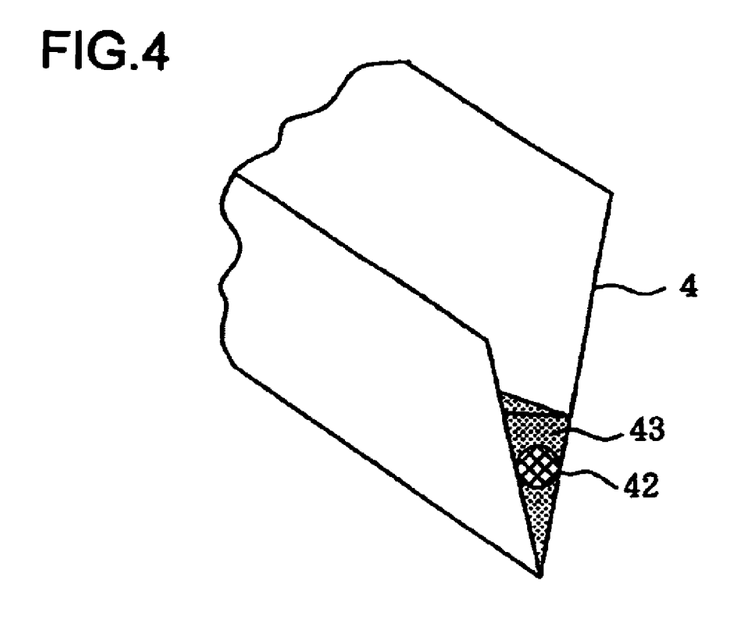
FIG. 4 schematically illustrates a state that the string-like sealing material shown in FIG. 3 has been applied to a V-shaped groove and heat-cured.

FIG. 3 illustrates another example of a string-like sealing material 31 composed of a string-like composite structure (b2). On the surface of a string-like body 33 formed from the thermosetting resin composition, a dimension-stabilizing aid 32 is integrally composited along the lengthwise direction thereof. When the string-like sealing material 31 is placed at an upper part of a groove of a V-shaped coated steel plate 4 having an angle of 15°, a narrow clearance is produced between the bottom of the V-shaped groove and the sealing material at normal temperature as illustrated in FIG. 3. The string-like sealing material 31 is arranged in such a manner that the dimension-stabilizing aid 32 is located on a side opposite to the bottom of the V-shaped groove, i.e., upward. When the string-like sealing material is heated to a heat-curing temperature of the thermosetting resin composition, the thermosetting resin composition 43 melt-flows to completely fill the bottom of the groove in the V-shaped coated steel plate 4 as illustrated in FIG. 4. When the dimension-stabilizing aid 42 is formed with a material not melted or decomposed upon the heat curing, it moves downward according to the melt flowing of the thermosetting resin composition and reaches the place of the allowed width of the V-shaped groove part.

Since the thermosetting resin composition is heated to the heat-curing temperature, it heat-cures at the same time as the melt flowing or after that. As illustrated in FIG. 4, the thermosetting resin composition located under the dimension-stabilizing aid 42 cures in the form of the groove bottom, and the thermosetting resin composition located on the dimension-stabilizing aid 42 forms a substantially flat cured seal area. Accordingly, the necessity of arranging the form of the sealed part by hand after the application is lightened. Even when the thermosetting resin composition melt-flows upon the heat curing, the thermosetting resin composition neither sags nor runs out to portions free of the dimension-stabilizing aid because the dimension-stabilizing aid is present, and the thermosetting resin composition moves together with the dimension-stabilizing aid.

Since the string-like sealing material composed of the string-like composite structure (b2) is excellent in dimensional stability at normal temperature so far as the elongation percentage thereof is within 10% as measured by applying a load to become stress of 5 N/cm$^2$ per unit sectional area at 23° C. for 5 minutes to the string-like sealing material in the lengthwise direction thereof, the dimensional stability of the string-like body itself forming the string-like composite structure (b2) may be insufficient. In other words, the elongation percentage of the string-like body may not be always within 10% as measured by applying a load to become stress of 5 N/cm$^2$ per unit sectional area at 23° C. for 5 minutes to the string-like body in the lengthwise direction thereof.

No particular limitation is imposed on the dimension-stabilizing aid used in the present invention, and as examples thereof, may be mentioned metal wires such as a copper wire; fine strings or rods formed from rubber or a thermoplastic resin, fabric strings formed from yarn such as cotton yarn, impregnated string with a fabric string impregnated with a resin emulsion, and linear materials such as glass strand roving. The sectional form of the dimension-stabilizing aid may be any of a circle, an ellipse, a triangle, a rectangle, a polygon, a screw form, a form having recesses and/or projections on the surface thereof, a form having a mesh on the surface thereof, a star type sectional form, and combinations thereof. It may be formed into a hollow body if desired. The effects of the present invention can be made far excellent by suitably selecting these forms.

The dimension-stabilizing aid is preferably a linear material formed from a material having heat resistance substantially not melted or decomposed upon the heat curing of the thermosetting resin composition. The dimension-stabilizing aid may be composed of a material having a melt flow rate (MFR) smaller than that of the thermosetting resin composition so far as it does substantially not melt upon heat curing. Since the dimension-stabilizing aid is subjected to a compositing processing with a thermosetting resin composition or a string-like body formed from the thermosetting resin composition upon forming of the string-like composite structure, it preferably has tensile strength enough to withstand the processing conditions. In addition, the dimension-stabilizing aid preferably has flexibility or softness in that the string-like sealing material is applied to application sites of various forms. The sectional size (thickness) of the string-like sealing material may be suitably determined according to the form or the like of the application site. When the section is almost circular, however, the diameter thereof is of the order of generally 0.5 to 10 mm, preferably 0.7 to 5 mm, more preferably 1 to 3 mm. Even in the case where the dimension-stabilizing aid is in another sectional form, it is preferred that the maximum value of the thickness or width be adjusted according to this. If the thickness of the dimension-stabilizing aid is too small, the dimension-stabilizing effect thereof is lessened, and it is also difficult to fully enlarge the thickness or width of the string-like body to be composited. If the thickness of the dimension-stabilizing aid is too great, it is difficult to apply the resulting string-like sealing material to a narrow groove part or the like. The thickness of the dimension-stabilizing aid is preferably smaller than the thickness of the string-like body to be composited.

In the present invention, the string-like body (a) alone formed from the thermosetting resin composition comprising the synthetic resin and the heat-curing agent may be used as a string-like sealing material without being composited with the dimension-stabilizing aid as it is because it is excellent in dimensional stability at normal temperature so far as the elongation percentage thereof is within 10% as measured by applying a load to become stress of 5 N/cm$^2$ per unit sectional area at 23° C. for 5 minutes to the string-like sealing material in the lengthwise direction thereof. However, the string-like body (hereinafter referred to as "dimensionally stable string-like body") is required to have good shape-retaining ability at normal temperature, but exhibit melt flowability upon heat curing.

Figure 5:
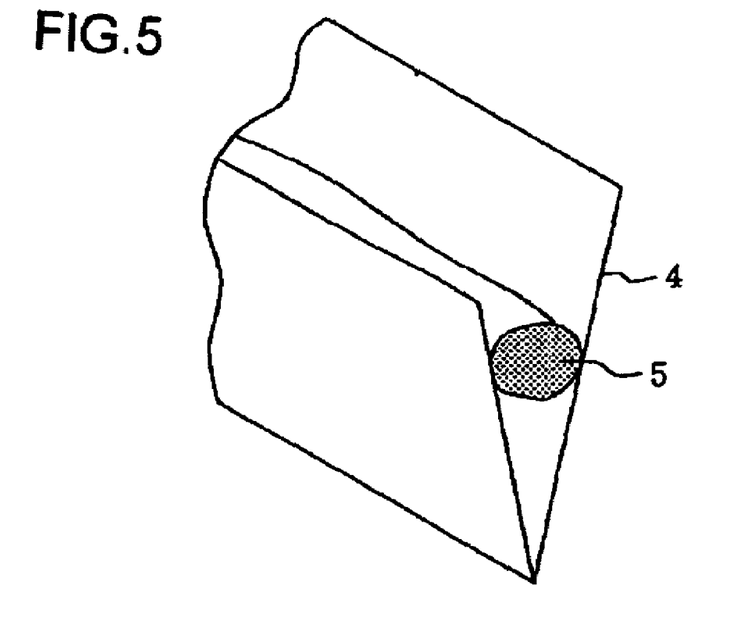
FIG. 5 schematically illustrates a specific example of a string-like sealing material composed of a string-like body according to the present invention and a state of the string-like sealing material applied to a V-shaped groove before heat curing.
Figure 6:
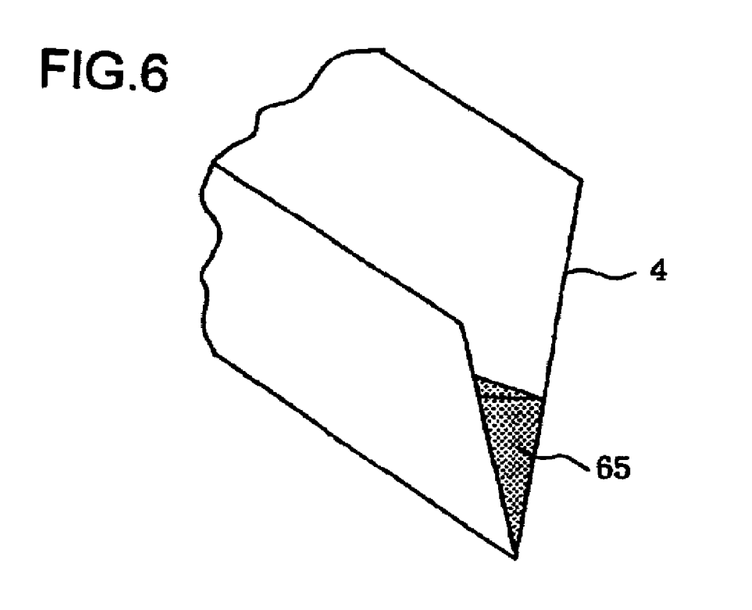
FIG. 6 schematically illustrates a state that the string-like sealing material shown in FIG. 5 has been applied to a V-shaped groove and heat-cured.

FIG. 5 schematically illustrates an example of a string-like sealing material 5 composed of a dimensionally stable string-like body. Since the thermosetting resin composition forming such a string-like body is solid at normal temperature and exhibits no flowability, the string-like sealing material 5 has good shape-retaining ability. The string-like sealing material 5 is excellent in dimensional stability and thus does not cause disadvantage that it is partially elongated during handling to be thinned, broken or loosened. When the string-like sealing material 5 is placed at an upper part of a groove of a V-shaped coated steel plate 4 having an angle of 15°, a narrow clearance is produced between the bottom of the V-shaped groove and the sealing material at normal temperature as illustrated in FIG. 5. When the string-like sealing material is then heated to a heat-curing temperature of the thermosetting resin composition, the thermosetting resin composition melt-flows to completely fill the bottom of the groove in the V-shaped coated steel plate 4 as illustrated in FIG. 6. Since the thermosetting resin composition is heated to the heat-curing temperature, it heat-cures at the same time as the melt flowing or after that. As illustrated in FIG. 6, the thermosetting resin composition 65 cures in the form of the groove bottom, and the surface thereof becomes substantially flat. Accordingly, the necessity of arranging the form of the sealed part by hand after the application is lightened. Even when the thermosetting resin composition melt-flows upon the heat curing, the thermosetting resin composition neither sags from an end of the V-shaped groove part nor runs out because the dimensional stability of the string-like sealing material is excellent, and the heat-curing ability thereof is suitably controlled.

Figure 7:
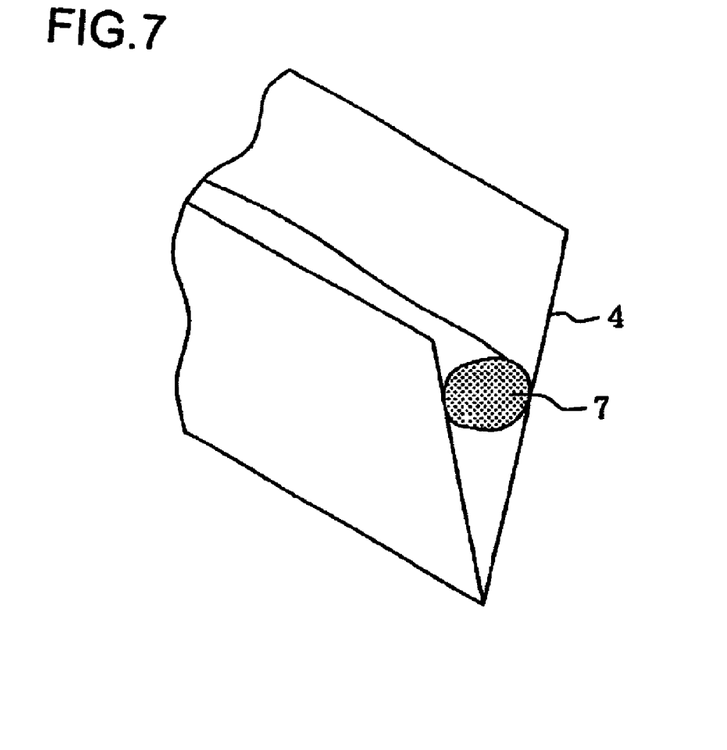
FIG. 7 schematically illustrates a specific example of a string-like sealing material composed of a comparative string-like body and a state of the string-like sealing material applied to a V-shaped groove before heat curing.
Figure 8:
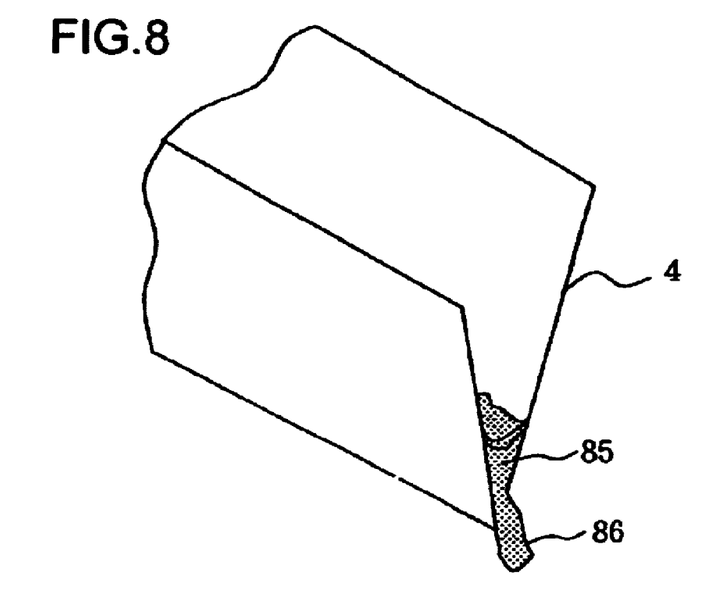
FIG. 8 schematically illustrates a state that the string-like sealing material shown in FIG. 7 has been applied to a V-shaped groove and heat-cured.

On the other hand, in the case of a string-like body, which is formed from a thermosetting resin composition comprising a synthetic resin and a heat-curing agent, and poor in dimensional stability in that the elongation percentage thereof exceeds 10% as measured by applying a load to become stress of 5 N/cm$^2$ per unit sectional area at 23° C. for 5 minutes to the string-like body in the lengthwise direction thereof, the use of the string-like body alone as the string-like sealing material fails to obtain satisfactory results. More specifically, an example of a string-like sealing material 7 composed of the string-like body poor in dimensional stability is illustrated in FIG. 7. Since the thermosetting resin composition forming the string-like body is solid at normal temperature and has no flowability, the string-like sealing material 7 has good shape-retaining ability at normal temperature. However, since the string-like sealing material 7 is poor in dimensional stability at normal temperature, it tends to cause disadvantage that it is partially elongated during handling to be thinned, broken or loosened. When the string-like sealing material 7 is placed at an upper part of a groove of a V-shaped coated steel plate 4 having an angle of 15°, a narrow clearance is produced between the bottom of the V-shaped groove and the sealing material at normal temperature as illustrated in FIG. 7. When the string-like sealing material is then heated to a heat-curing temperature of the thermosetting resin composition, the thermosetting resin composition melt-flows to completely fill the bottom of the groove in the V-shaped coated steel plate 4 as illustrated in FIG. 8. Since the thermosetting resin composition is heated to the heat-curing temperature, it heat-cures at the same time as the melt flowing or after that. However, the thermosetting resin composition involves a problem that the surface profile of the sealing material 85 cured is disordered, and moreover a part of the thermosetting resin composition runs out of an end of the V-shaped groove part to form a cured flash area 86. More specifically, this thermosetting resin composition involves a problem that the resin composition itself is generally too low in melt viscosity upon heat curing and tends to form sag, and so it runs out to other places than the application site to cure when it is used as a sealing material.

On the other hand, a string-like sealing material produced with a thermosetting resin composition which is excellent in dimensional stability but has no melt flowability upon heat curing cannot be completely filled up to the bottom of the V-shaped groove part.

The thermosetting resin composition used in the present invention is a resin composition comprising a synthetic resin and a heat-curing agent. This thermosetting resin composition is solid at normal temperature (5 to 35° C.) and substantially exhibits no flowability. The thermosetting resin composition also exhibits melt flowability upon heat curing. Accordingly, the string-like body formed from this thermosetting resin composition has good shape-retaining ability at normal temperature, but exhibits melt flowability upon heat curing. Quite naturally, the string-like body has good shape-retaining ability even at a temperature lower than normal temperature. It is desirable that even when the temperature exceeds the normal temperature, the string-like body have the shape-retaining ability until the heat-curing temperature conditions are reached. On the other hand, it is desirable from the viewpoint of sealing property and productivity that the string-like body exhibit melt flowability as a whole in a short period of time when it is heated to the heat-curing temperature of the thermosetting resin composition.

As the synthetic resin making up the thermosetting resin composition, may be mentioned a thermosetting resin, a thermoplastic resin or a mixture thereof. Preference is generally given to the combined use of the thermosetting resin with a thermoplastic resin rather than the single use thereof. More specifically, the thermosetting resin composition used in the present invention is preferably a reactive resin composition comprising a thermosetting resin and a thermoplastic resin in that various properties such as viscosity, shape-retaining ability, cohesive force and melt flowability are controlled, and heat resistance, solvent resistance, rust proofness, sealing property, etc. are improved. A thermosetting resin composition, which is solid at normal temperature and substantially exhibits no flowability, but exhibits good melt flowability upon heat curing, can be easily prepared by adjusting the kinds and mixing proportions of the thermosetting resin, the thermoplastic resin, fillers and other additives, etc. For example, a resin composition comprising a thermoplastic resin and a thermosetting resin each having a relatively high melting point is suitable. The melt flowability (viscosity) can be easily controlled by varying the ratio between both resins and the mixing proportions of the additives such as a filler.

No particular limitation is imposed on the thermosetting resin so far as it is a resin heat cured upon use. As preferable examples thereof, may be mentioned epoxy resins, urethane (meth)acrylate resins and epoxy (meth)acrylate resins. Since these thermosetting resins are comparatively available and rich in kind, the range of choice is wide. In addition, they are composed of 100% solids and free of a solvent so as not to contaminate air, and thus are gentle in environment. These thermosetting resins may be used either singly or in any combination thereof. Among these, urethane (meth)acrylate resins and epoxy (meth)acrylate resins are particularly preferred because they can be cured at a relatively low temperature.

Examples of the thermoplastic resin include polyethylene resins such as polyethylene (PE), ethylene-vinyl acetate copolymers (EVA), ethylene-acrylic acid copolymers (EAA), ethylene-methyl methacrylate copolymers (EMAA), ethylene-methyl acrylate copolymers (EMA) and ethylene-ethyl acrylate copolymers (EEA); rubbery polymers such as polybutadiene (PB); and various kinds of thermoplastic resins such as saturated polyester resins, polyamide (PA), polyurethane (PU), polybutylene, polybutene, polyvinyl butyral and ionomers (IO). Among these, ethylene copolymer resins such as EVA and EEA, saturated polyester resins, and polybutadiene are preferred. In the present invention, the term "thermoplastic resin" is used in a wide sense including rubbery polymers and the like in addition to the typical thermoplastic resins. These thermoplastic resins may be used either singly or in any combination thereof.

The thermoplastic resin may also be used without combining with the thermosetting resin. For example, a thermoplastic resin such as EVA can be formed into a string-like body by selecting a heat-curing agent and conducting extrusion at a relatively low temperature. This string-like body may be made excellent in dimensional stability. More specifically, a string-like body formed from a thermosetting resin composition comprising EVA and an organic peroxide is excellent in dimensional stability even when it is not composited with a dimension-stabilizing aid, exhibits melt flowability upon heat curing and can be crosslinked (cured) with the organic peroxide. This string-like body has a non-tacky surface and thus excellent in workability. Similarly, a thermoplastic resin such as EVA or EEA can be formed into a string-like sealing material excellent in dimensional stability by using it in combination with a small amount of a thermosetting resin and an organic peroxide even when it is not composited with a dimension-stabilizing aid.

In the thermosetting resin composition used in the present invention, a mixing proportion of the thermosetting resin and the thermoplastic resin, which form the synthetic resin, may be suitably selected according to the kinds of the respective resins, the intended melt flowability and the like. However, it is generally 0:100 to 95:5, preferably 0:100 to 90:10, more preferably 0:100 to 80:20, most preferably 0:100 to 70:30 in terms of a weight ratio. Although a thermoplastic resin may be used singly when it is EVA or the like, a thermosetting resin and a thermoplastic resin are used in combination in many cases. In this case, a weight ratio of the thermosetting resin to the thermoplastic resin is preferably 0.5:99.5 to 95:5, more preferably 1:99 to 90:10. Excellent results can be yielded when the proportion of the thermosetting resin is low. However, good results may be obtained even when the proportion of the thermosetting resin is relatively high, for example, a weight ratio of the thermosetting resin to the thermoplastic resin is of the order of 20:80 to 80:20, further 30:70 to 70:30. When a thermoplastic resin such as EVA or EEA is used to provide a string-like sealing material excellent in dimensional stability without compositing it with the dimension-stabilizing aid, it is desirable that no thermosetting resin be used, or a mixing proportion (weight ratio) of the thermosetting resin to the thermoplastic resin be controlled to about 0.5:99.5 to 10:90 if used. The kinds and mixing proportions of the respective resins are desirably selected in such a manner that the synthetic resin exhibits melt flowability at generally 70 to 250° C., preferably 80 to 200° C.

In the present invention, the thermosetting resin composition is prepared by adding a heat-curing agent to such resin components as described above. The heat-curing agent means a curing agent exhibiting performance by heat and capable of curing or crosslinking the thermosetting resin and/or the thermoplastic resin, including a heat reaction initiator (heat-curing catalyst) such as an organic peroxide, or an epoxy curing agent such as an amine. Specific examples of the heat-curing agent include organic peroxides such as dicumyl peroxide, 2,5-dimethyl-2,5-di(t-butylperoxy)hexyn-3, α, α'-bis(t-butylperoxy-m-isopropyl)benzene, peroxy dicarbonate, methyl ethyl ketone peroxide, cyclohexanone peroxide, 1,1-bis(t-butylperoxy)-3,3,5-trimethylcyclohexane, 2,2-bis(t-butylperoxy)butane, t-butyl hydroperoxide, 2,5-dimethylhexane-2,5-dihydroperoxide, octanoyl peroxide, isobutyl peroxide, bis(4-t-butylcyclohexyl) peroxydicarbonate, benzoyl peroxide, α,α'-bis(t-butylperoxy) diisopropylbenzene and 2,5-dimethyl-bis(t-butylperoxy) hexane; aliphatic polyamines, alicyclic polyamines, aromatic polyamines, bisazides, dicarboxylic acids, acid anhydrides, diols, polyhydric phenols, polyamides, diisocyanates, and polyisocyanates. These heat-curing agents may be used either singly or in any combination thereof in view of the kind of the synthetic resin used, the forming temperature of the string-like body and the heat-curing temperature of the string-like sealing material.

The proportion of the heat-curing agent used can be determined by the kinds of the thermosetting resin and/or the thermoplastic resin. However, it is generally 0.01 to 15 parts by weight, preferably 0.1 to 10 parts by weight, more preferably 0.5 to 5 parts by weight per 100 parts by weight of the synthetic resin. If the mixing proportion of the heat-curing agent is too low, curing is hard to occur, and so it is difficult to achieve properties such as heat resistance and weather resistance. The mixing proportion too high of the heat-curing agent is not economical, and there is a possibility that the flexibility, watertightness and airtightness of a part sealed with the resulting sealing material may be deteriorated.

To the thermosetting resin composition used in the present invention, may be added fillers such as talc, silica, clay, calcium carbonate and carbon black; coloring materials such as dyes and pigments; surfactants, ultraviolet absorbents, antioxidants, metal powder, etc. as needed. Paraffin, rosin or the like may be suitably mixed as a melt flowability adjustor.

Into the thermosetting resin composition, may be preferably mixed a filler from the viewpoints of property adjustment and profitability. The filler is used in a proportion of generally 0.1 to 50 parts by weight, preferably 0.3 to 30 parts by weight, more preferably 0.4 to 20 parts by weight per 100 parts by weight of the synthetic resin. If the mixing proportion of the filler is too high, the melt flowability upon heat curing of the resulting thermosetting resin composition is impaired.

The thermosetting resin composition used in the present invention is preferably prepared by melting and kneading the respective components and also preferably substantially contains no solvent. No particular limitation is imposed on the process for producing the string-like sealing material according to the present invention. However, there may be generally adopted ① a process in which the thermosetting resin composition is fed to an extruder and melt-extruded in the form of string to form a string-like body, ② a process in which the dimension-stabilizing aid is integrally composited with the string-like body formed by the melt extrusion, and ③ a process in which the thermosetting resin composition is fed to an extruder equipped with a crosshead die and extruded together with the dimension-stabilizing aid.

In order to composite the dimension-stabilizing aid in the interior of the string-like body, it is effective to use a process in which the thermosetting resin composition is fed to an extruder equipped with a crosshead die and extruded together with the dimension-stabilizing aid to form a coating layer of the thermosetting resin on the dimension-stabilizing aid. In order to composite and arrange the dimension-stabilizing aid on the surface of the string-like body, it is preferable to use a process in which the string-like body right after extruded and the dimension-stabilizing aid composed of a linear material are passed through between rolls having a concave groove to unite them. The dimension-stabilizing aid is brought into close contact with the surface of the string-like body, or a part or the whole of the aid is embedded into the string-like body to form a string-like composite structure. The melt kneading and extrusion are conducted at a temperature not lower than the melting temperature of the synthetic resin, but lower than the activating temperature of the heat-curing agent.

The sectional form of the string-like body may be suitably determined similar to the case of the dimension-stabilizing aid. The sectional size of the string-like body composed of the thermosetting resin composition may also be suitably determined. When the section is circular, the diameter thereof is of the order of generally 1.5 to 30 mm, preferably 2 to 20 mm, more preferably 3 to 15 mm. It is desirable that the sectional size of the string-like sealing material composited with the dimension-stabilizing aid be also almost the same as described above. In the case of the string-like sealing material composed of the composite structure (b1), the thickness of the coating layer of the thermosetting resin composition on the dimension-stabilizing aid is of the order of preferably 0.5 to 10 mm, more preferably 1 to 5 mm. In the case where the section of the string-like sealing material is in another form than the circle, the sectional size thereof is adjusted according to the above.

When the surface of the string-like body formed from the thermosetting resin composition has tackiness, the application workability thereof is generally good because it is tack-fixed to an application site. However, the string-like body having tackiness at the surface thereof may be difficult in some cases to be arranged at the application site because it adheres to another site when it is applied to a narrow site such as a V-shaped groove part. In the string-like sealing material according to the present invention, the surface of the string-like body may be made non-tacky by attaching non-tacky powder such as talc or silica, paraffin, wax or the like to the surface when the surface of the string-like body has tackiness. The non-tacky powder can be attached by spraying it on the string-like sealing material or dipping the string-like sealing material into an aqueous dispersion containing the powder and drying it. The paraffin or the like may be attached to the surface by melting it and passing the string-like sealing material through the melt. The string-like body making single use of EVA as the synthetic resin can be made non-tacky at its surface.

The string-like sealing material according to the present invention is required to have an elongation percentage within 10% as measured by applying a load to become stress of 5 N/cm$^2$ per unit sectional area at 23° C. for 5 minutes to the string-like sealing material in the lengthwise direction thereof in each case of the string-like body (a) obtained by forming a thermosetting resin composition comprising a synthetic resin and a heat-curing agent and the string-like composite structure (b) obtained by arranging a dimension-stabilizing aid along the lengthwise direction of the string-like body (a). Since the string-like sealing material composed mainly of an uncured thermosetting resin composition is a long string-like formed product, it tends to be deformed by its own weight upon handling. This string-like sealing material is treated by hand upon application. At this time, it tends to be deformed under various external forces such as tensile force. When the string-like sealing material tends to be deformed, it is easy to cause disadvantage that it is partially elongated during handling to be thinned, broken or loosened.

The present inventors have synthetically investigated the own weight of the string-like sealing material, the maximum strength upon stretching by hands, the ordinary sectional area of the string-like sealing material, etc. As a result, it has been found that when the elongation percentage of the string-like sealing material is within 5% as measured by applying a load to become stress of 5 N/cm$^2$ per unit sectional area at 23° C. for 5 minutes to the string-like sealing material in the lengthwise direction thereof, such a string-like sealing material is excellent in dimensional stability, slight in deformation during handling and thus markedly improved in handling property. As a method for improving the dimensional stability, there are a method of being composited with the dimension-stabilizing aid and a method of selecting the composition of the thermosetting resin composition itself as described above. When a thermoplastic resin such as EVA is used by itself, the dimensional stability can be made excellent by the string-like body alone composed of the thermosetting resin composition. When the dimensional stability of the string-like body is insufficient, the dimensional stability can be imparted or improved by compositing it with the dimension-stabilizing aid.

A specific measuring method of the elongation percentage used as an index to the dimensional stability is as follows. An end of a string-like sealing material sample is fixed to hang down it, and the other end (lower end) is held by a clip to hang down a weight. The length of the sample to be measured is determined to be 100 mm. The measuring temperature is controlled to 23° C. (±1° C.). When an elongation percentage is measured at this temperature, the resulting value may be used as an index to dimensional stability at normal temperature. The weight of the weight is adjusted so as to give stress of 5 N/cm$^2$ per unit sectional area. Elongation upon elapsed time of 5 minutes after the weight is hung is measured to calculate out an elongation percentage. This elongation percentage must be within 10% from the viewpoint of dimensional stability. It is preferred that the elongation percentage be within 5%, with no elongation being more preferred. It is desirable that the level of deformation after removing the weight is also determined to investigate the degree of restoration to the original length. It is preferred from the viewpoint of dimensional stability that the string-like sealing material stretched after removing the weight be restored to the elongation percentage within 5% of the original length.

The weight of the weight corresponding to the stress of 5 N/cm$^2$ per unit sectional area may not be adjusted according to the sectional area of the string-like sealing material sample. In such a case, the case where an elongation percentage under, for example, a load (weight of the weight) corresponding to stress less than 5 N/cm$^2$ per unit sectional area is at least 10% can be evaluated as the elongation percentage under the stress of 5 N/cm$^2$ being at least 10%. Similarly, the case where an elongation percentage under a load corresponding to stress exceeding 5 N/cm$^2$ per unit sectional area is at most 10% can be evaluated as the elongation percentage under the stress of 5 N/cm$^2$ being at most 10%. In the present invention, the string-like sealing material the elongation percentage of which is within 10% under stress of preferably 30 N/cm$^2$, more preferably 50 N/cm$^2$, particularly preferably 80 N/cm$^2$ or stress (for example, stress of at least 100 N/cm$^2$) greater than this is desirable.

In order to conduct application by means of the string-like sealing material according to the present invention, the string-like sealing material is placed on an application site and heated to be cured. The heating temperature is generally 70 to 250° C., preferably 80 to 200° C., more preferably 120 to 190° C., and the heating time is generally 1 to 120 minutes, preferably 5 to 60 minutes, more preferably 10 to 40 minutes. A heating means may be suitably selected. As examples thereof, may be mentioned a heating oven, a hot-air dryer, etc. When the string-like sealing material is heated to the heat-curing temperature, the thermosetting resin composition forming the string-like body melt-flows, and at the same time or after that heat-cures.

The string-like sealing material according to the present invention can be designed so as to satisfy all of dimensional stability at normal temperature, melt flowability and shape-retaining ability upon heat curing, practical heat resistance, durability, etc. after application under given various conditions such as the form of an application site and heating conditions by selecting the materials and compositional ratio of the component making up the thermosetting resin composition, the kind and mixing proportion of the filler, the kind and mixing proportion of the heat reaction initiator or the like, etc. and further by being optionally composited with the dimension-stabilizing aid.

The string-like sealing materials according to the present invention can be suitably used to a wide variety of fields such as automobiles-vehicles, ships, aircraft, buildings, civil engineering, and various kinds of machines and apparatus.

The string-like sealing material according to the present invention is placed on an application site, and the string-like sealing material is heated, whereby the thermosetting resin forming the string-like sealing material can be caused to melt-flow and cure to conduct sealing. The string-like sealing material according to the present invention is suitable for use in sealing of a narrow and deep groove part such as a V-shaped groove as an application site. The string-like sealing material according to the present invention is placed at an upper part of a groove and then heated, thereby causing the thermosetting resin composition to melt-flow and cure at the same time as the melt flowing or after that, whereby the thermosetting resin composition can be surely filled up to the bottom of the groove, and moreover a cured sealed part can be formed in good shape.

Even when the string-like sealing material according to the present invention is placed along an application site in which an inclined part, curved part and/or bent part is present, and heated, occurrence of sagging at an end of the application site can be prevented of course, and moreover none of thin portions and thick portions are produced in the form of the sealing material after the curing to prevent finishing from becoming uneven. In particular, according to the string-like sealing material of the present invention composited with the dimension-stabilizing aid, the unevenness of thickness due to sagging is effectively prevented even when it is placed along an application site in which a curved portion curved upward is present, and caused to melt-flow by heating.

EXAMPLES

The present invention will hereinafter be described more specifically by the following examples and comparative examples.

Example 1

String-Like Composite Structure (b1)-1

| Thermosetting resin composition: | | (parts by weight) |
|---|---|---|
| ① | Ethylene-vinyl acetate copolymer (product of Mitsui Petrochemical Industries, Ltd., EVA 45X) | 450 parts |
| ② | Ethylene-vinyl acetate copolymer (product of Mitsui Petrochemical Industries, Ltd., EVA 310) | 450 parts |
| ③ | Urethane acrylate resin (product of Sievel Hegner Co., Ltd., Acrossacritane 290) | 600 parts |
| ④ | Talc (product of Nippon Talc Co., Ltd., Microace K-1) | 50 parts |
| ⑤ | Heat reaction initiator (product of Nippon Oil & Fats Co., Ltd., Perhexa 3M-40) | 10 parts |

The above respective components were kneaded in a kneader to obtain a thermosetting resin composition. A string-like extrudate having a diameter of about 3 mm composed of butyl rubber was used as a dimension-stabilizing aid.

The thermosetting resin composition was fed to an extruder equipped with a crosshead die and extruded at a resin temperature of 60° C. together with the butyl rubber-made string-like extrudate to obtain a string-like sealing material which was circular in section, slightly tacky at the surface thereof and had a diameter of about 7 mm.

The string-like sealing material thus obtained was substantially not elongated when a load to become stress of 30 N/cm$^2$ per unit sectional area was applied at 23° C. for 5 minutes to the string-like sealing material in the lengthwise direction thereof. Even when a load to become stress of 100 N/cm$^2$ was applied, the string-like sealing material was substantially not elongated, and thus it was excellent in dimensional stability.

The string-like sealing material obtained in the above-described manner was cut into lengths of 14 cm and placed at an upper part of a V-shaped groove having an angle of 15° and a length of 15 cm formed of an electrodeposition coated steel plate. A distance between the center of the string-like sealing material and the bottom of the groove was about 2.5 cm. In this state, the string-like sealing material was heated at 160° C. for 30 minutes. As a result, the thermosetting resin composition of the string-like sealing material melt-flowed to fill the bottom of the V-shaped groove, and the dimension-stabilizing aid was stayed at a position upward about 1 cm from the bottom of the groove. The dimension-stabilizing aid was surrounded with the cured thermosetting resin composition.

The thermosetting resin composition melt-flowed did not run out from both ends of the V-shaped groove, and the end section of the dimension-stabilizing aid was able to be observed from the side of the groove. More specifically, the thermosetting resin composition melt-flowed up to the bottom of the V-shaped groove in a width almost equal to the length of the dimension-stabilizing aid.

Example 2

String-Like Composite Structure (b2)-1

A thermosetting resin composition of the same composition as that prepared in Example 1 was fed to an extruder and melt extruded at a resin temperature of 60° C. into string. Right after the extrusion, a string-like body having a diameter of about 5 mm formed by the melt extrusion was passed through between rolls having a concave groove together with a string-like extrudate (dimension-stabilizing aid) having a diameter of about 2 mm composed of butyl rubber to obtain a string-like sealing material (diameter=about 5 mm) with both resin composition and dimension-stabilizing aid united to each other. This string-like sealing material was a string-like composite structure with the dimension-stabilizing aid composed of the butyl rubber embedded within the surface of the string-like body composed of the thermosetting resin composition. The section thereof was substantially circular. The surface of the string-like body was slightly tacky. In order to make the surface of the string-like body non-tacky, the string-like sealing material was passed through an aqueous solution in which talc was dispersed, and then dried.

The string-like sealing material thus obtained was substantially not elongated when a load to become stress of 30 N/cm$^2$ per unit sectional area was applied at 23° C. for 5 minutes to the string-like sealing material in the lengthwise direction thereof. Even when a load to become stress of 100 N/cm$^2$ was applied, the string-like sealing material was substantially not elongated, and thus it was excellent in dimensional stability.

The string-like sealing material obtained in the above-described manner was used to conduct a test in the same manner as in Example 1. As a result, the thermosetting resin composition of the string-like sealing material melt-flowed to fill the bottom of the V-shaped groove, and the dimension-stabilizing aid was stayed at a position upward about 0.8 cm from the bottom of the groove. The dimension-stabilizing aid was surrounded with the cured thermosetting resin composition.

The thermosetting resin composition melt-flowed did not run out from both ends of the V-shaped groove, and the end section of the dimension-stabilizing aid was able to be observed from the side of the groove. More specifically, the thermosetting resin composition melt-flowed up to the bottom of the V-shaped groove in a width almost equal to the length of the dimension-stabilizing aid.

Example 3

String-Like Composite Structure (b1)-2

| Thermosetting resin composition: | | (parts by weight) |
|---|---|---|
| ① | Saturated polyester resin (product of Toyobo Co., Ltd., Vyron 550) | 450 parts |
| ② | Epoxy acrylate resin (product of Showa Highpolymer Co., Ltd., LIPOXY VR-90) | 300 parts |
| ③ | Silica (product of Nippon Aerosil Co., Ltd., Aerosil No. 300) | 3 parts |
| ④ | High-melting paraffin (product of Beikoku Boeki K. K., Microfine) | 7 parts |
| ⑤ | Heat reaction initiator (product of Nippon Oil & Fats Co., Ltd., Naiper FF) | 4 parts |

The above respective components were kneaded in a kneader to obtain a thermosetting resin composition. A copper wire having a diameter of 1.5 mm was used as a dimension-stabilizing aid.

The thermosetting resin composition was fed to an extruder equipped with a crosshead die and extruded at a resin temperature of 70° C. together with the copper wire to obtain a string-like sealing material which was circular in section, non-tacky at the surface thereof and had a diameter of about 5.5 mm.

The string-like sealing material thus obtained was substantially not elongated when a load to become stress of 30 N/cm$^2$ per unit sectional area was applied at 23° C. for 5 minutes to the string-like sealing material in the lengthwise direction thereof. Even when a load to become stress of 100 N/cm$^2$ was applied, the string-like sealing material was substantially not elongated, and thus it was excellent in dimensional stability.

The string-like sealing material obtained in the above-described manner was used to conduct a test in the same manner as in Example 1 except that the heating conditions were changed to 140° C. for 30 minutes. The copper wire of the dimension-stabilizing aid reached almost near the bottom of the V-shaped groove, and the thermosetting resin composition filled the bottom of the groove, and covered the copper wire. The thermosetting resin composition did not run out from the end of the V-shaped groove. More specifically, the thermosetting resin composition melt-flowed up to the bottom of the V-shaped groove in a width almost equal to the length of the dimension-stabilizing aid.

Example 4

String-Like Composite Structure (b2)-2

A thermosetting resin composition of the same composition as that prepared in Example 3 was fed to an extruder and melt extruded at a resin temperature of 70° C. into string. Right after the extrusion, a string-like body having a diameter of about 4 mm formed by the melt extrusion was passed through between rolls having a concave groove together with a copper wire (dimension-stabilizing aid) having a diameter of 1 mm to obtain a string-like sealing material (diameter=about 4 mm) with both resin composition and dimension-stabilizing aid united to each other. This string-like sealing material was a string-like composite structure with the copper wire embedded within the surface of the string-like body composed of the thermosetting resin composition. The section thereof was substantially circular.

The string-like sealing material thus obtained was substantially not elongated when a load to become stress of 30 N/cm$^2$ per unit sectional area was applied at 23° C. for 5 minutes to the string-like sealing material in the lengthwise direction thereof. Even when a load to become stress of 100 N/cm$^2$ was applied, the string-like sealing material was substantially not elongated, and thus it was excellent in dimensional stability.

The string-like sealing material obtained in the above-described manner was used to conduct a test in the same manner as in Example 1 except that the heating conditions were changed to 140° C. for 30 minutes. The copper wire reached almost near the bottom of the V-shaped groove, and the thermosetting resin composition filled the bottom of the groove, and covered the copper wire. The thermosetting resin composition did not run out from the end of the V-shaped groove. More specifically, the thermosetting resin composition melt-flowed up to the bottom of the V-shaped groove in a width almost equal to the length of the dimension-stabilizing aid.

Example 5

String-Like Composite Structure (b1)-3

| Thermosetting resin composition: | | (parts by weight) |
|---|---|---|
| ① | Epoxy resin [product of Yuka Shell K. K., Epikote 1001 (solid)] | 350 parts |
| ② | Epoxy resin [product of Yuka Shell K. K., Epikote 828 (liquid)] | 150 parts |
| ③ | Saturated polyester resin [product of Toyobo Co., Ltd., Vyron 300 (solid)] | 250 parts |
| ④ | Silica (product of Nippon Aerosil Co., Ltd., Aerosil R-972) | 15 parts |
| ⑤ | Epoxy resin curing agent (product of Shikoku Chemicals Corp., Curesol 2MZ-AZINE) | 4 parts |
| ⑥ | Dicyandiamide (product of Nippon Carbide Industries Co., Inc., epoxy resin curing agent) | 20 parts |

The above respective components were kneaded in a kneader to obtain a thermosetting resin composition. An impregnated string having a diameter of about 3 mm obtained by impregnating string composed of cotton yarn with a polyurethane emulsion was used as a dimension-stabilizing aid.

The thermosetting resin composition was fed to an extruder equipped with a crosshead die and extruded at a resin temperature of 70° C. together with the impregnated string to obtain a string-like sealing material which was circular in section, non-tacky at the surface thereof and had a diameter of about 7.5 mm.

The string-like sealing material thus obtained was substantially not elongated when a load to become stress of 30 N/cm² per unit sectional area was applied at 23° C. for 5 minutes to the string-like sealing material in the lengthwise direction thereof. Even when a load to become stress of 100 N/cm² was applied, the string-like sealing material was substantially not elongated, and thus it was excellent in dimensional stability.

The string-like sealing material obtained in the above-described manner was used to conduct a test in the same manner as in Example 1 except that the heating conditions were changed to 180° C. for 20 minutes. The impregnated string of the dimension-stabilizing aid reached a place about 1 cm apart from the bottom of the V-shaped groove, and the thermosetting resin composition filled the bottom of the groove, and covered the impregnated string. The thermosetting resin composition did not run out from the end of the V-shaped groove. More specifically, the thermosetting resin composition melt-flowed up to the bottom of the V-shaped groove in a width almost equal to the length of the dimension-stabilizing aid.

Example 6

String-Like Composite Structure (b2)-3

A thermosetting resin composition of the same composition as that prepared in Example 5 was fed to an extruder and melt extruded at a resin temperature of 70° C. into string. An impregnated string having a diameter of about 3 mm obtained by impregnating string composed of cotton yarn with a polyurethane emulsion was used as a dimension-stabilizing aid. Right after the extrusion, a string-like body having a diameter of about 4 mm formed by the melt extrusion was passed through between rolls having a concave groove together with the impregnated string having a diameter of about 3 mm to obtain a string-like sealing material (diameter=about 5 mm) with both resin composition and dimension-stabilizing aid united to each other. This string-like sealing material was a string-like composite structure with the impregnated string embedded within the surface of the string-like body composed of the thermosetting resin composition. The section thereof was substantially circular. Since the surface of the string-like body was slightly tacky, talc was sprayed to make the surface of the string-like body non-tacky.

The string-like sealing material thus obtained was substantially not elongated when a load to become stress of 30 N/cm² per unit sectional area was applied at 23° C. for 5 minutes to the string-like sealing material in the lengthwise direction thereof. Even when a load to become stress of 100 N/cm² was applied, the string-like sealing material was substantially not elongated, and thus it was excellent in dimensional stability.

The string-like sealing material obtained in the above-described manner was used to conduct a test in the same manner as in Example 1 except that the heating conditions were changed to 180° C. for 20 minutes. The impregnated string of the dimension-stabilizing aid reached a position upward about 1 cm from the bottom of the V-shaped groove, and the thermosetting resin composition filled the bottom of the groove, and covered the impregnated string. The thermosetting resin composition did not run out from the end of the V-shaped groove. More specifically, the thermosetting resin composition melt-flowed up to the bottom of the V-shaped groove in a width almost equal to the length of the dimension-stabilizing aid.

Example 7

String-Like Composite Structure (b1)-4

| Thermosetting resin composition: | | (parts by weight) |
|---|---|---|
| ① | Polybutadiene (product of Japan Synthetic Rubber., Co., Ltd., RB-810) | 600 parts |
| ② | Urethane acrylate resin (product of The Nippon Synthetic Chemical Industry Co., Ltd., Shiko V-2000B) | 400 parts |
| ③ | Talc (product of Nippon Talc Co., Ltd., Microace K-1) | 100 parts |
| ④ | Heat reaction initiator (product of Nippon Oil & Fats Co., Ltd., Perhexa 25B-40) | 10 parts |

The above respective components were kneaded in a kneader to obtain a thermosetting resin composition. Glass strand roving having a diameter of about 2.5 mm was used as a dimension-stabilizing aid.

The thermosetting resin composition was fed to an extruder equipped with a crosshead die and extruded at a resin temperature of 60° C. together with the glass strand roving to obtain a string-like sealing material which was circular in section, slightly tacky at the surface thereof and had a diameter of about 7 mm. The thermosetting resin composition well penetrated into the glass strand roving. Talc was sprayed on the surface of the string-like sealing material to make the surface of the string-like body non-tacky The string-like sealing material thus obtained was substantially not elongated when a load to become stress of 30 N/cm² per unit sectional area was applied at 23° C. for 5 minutes to the string-like sealing material in the lengthwise direction thereof. Even when a load to become stress of 100 N/cm² was applied, the string-like sealing material was substantially not elongated, and thus it was excellent in dimensional stability.

The string-like sealing material obtained in the above-described manner was used to conduct a test in the same manner as in Example 1 except that the heating conditions were changed to 160° C. for 30 minutes. The glass strand roving of the dimension-stabilizing aid reached a place about 1 cm apart from the bottom of the V-shaped groove, and the thermosetting resin composition filled the bottom of the groove, and covered the glass strand roving. The thermosetting resin composition did not run out from the end of the V-shaped groove. More specifically, the thermosetting resin composition melt-flowed up to the bottom of the V-shaped groove in a width almost equal to the length of the glass strand roving.

Example 8

String-Like Composite Structure (b2)-4

A thermosetting resin composition of the same composition as that prepared in Example 7 was fed to an extruder and melt extruded at a resin temperature of 60° C. into string. Glass strand roving having a diameter of about 2.5 mm was used as a dimension-stabilizing aid. Right after the extrusion, a string-like body having a diameter of about 4 mm formed by the melt extrusion was passed through between rolls having a concave groove together with the glass strand roving to obtain a string-like sealing material (diameter=about 5 mm) with both resin composition and dimension-stabilizing aid united to each other. This string-like sealing material was a string-like composite structure with the glass strand roving embedded within the surface of the string-like body composed of the thermosetting resin composition. The section thereof was substantially circular. Since the surface of the string-like body was slightly tacky, talc was sprayed to make the surface of the string-like body non-tacky.

The string-like sealing material thus obtained was substantially not elongated when a load to become stress of 30 N/cm$^2$ per unit sectional area was applied at 23° C. for 5 minutes to the string-like sealing material in the lengthwise direction thereof. Even when a load to become stress of 100 N/cm$^2$ was applied, the string-like sealing material was substantially not elongated, and thus it was excellent in dimensional stability.

The string-like sealing material obtained in the above-described manner was used to conduct a test in the same manner as in Example 1 except that the heating conditions were changed to 160° C. for 30 minutes. The glass strand roving of the dimension-stabilizing aid reached a position upward about 1 cm from the bottom of the V-shaped groove, and the thermosetting resin composition filled the bottom of the groove, and covered the glass strand roving. The thermosetting resin composition did not run out from the end of the V-shaped groove. More specifically, the thermosetting resin composition melt-flowed up to the bottom of the V-shaped groove in a width almost equal to the length of the glass strand roving.

Example 9

String-Like Body (a)-1

A string-like sealing material the surface of which was non-tacky was produced in accordance with the following formulation having good dimensional stability without using any dimension-stabilizing aid.

| Thermosetting resin composition: | | (parts by weight) |
|---|---|---|
| ① | Ethylene-vinyl acetate copolymer (product of Mitsui Petrochemical Industries, Ltd., EVA 45X) | 200 parts |
| ② | Ethylene-vinyl acetate copolymer (product of Mitsui Petrochemical Industries, Ltd., EVA 200) | 800 parts |
| ③ | Heat reaction initiator (product of Nippon Oil & Fats Co., Ltd., Percumyl D) | 10 parts |

The above respective components were kneaded in a kneader to obtain a thermosetting resin composition. The thermosetting resin composition was fed to an extruder and extruded at a resin temperature of 60° C. into string in the same manner as in Example 2. The thus-obtained string-like body having a diameter of 5 mm was used as a string-like sealing material. This string-like sealing material was not-tacky at the surface thereof.

The string-like sealing material thus obtained was substantially not elongated when a load to become stress of 30 N/cm$^2$ per unit sectional area was applied at 23° C. for 5 minutes to the string-like sealing material in the lengthwise direction thereof. When a load (153 N/cm$^2$) of about 30 N was applied to this string-like sealing material, the elongation percentage thereof was within 10%. When the load was removed, the string-like sealing material was immediately restored to the original length.

The resultant string-like sealing material was used to conduct a test in the same manner as in Example 1 except that the heating conditions were changed to 160° C. for 20 minutes. The thermosetting resin composition filled the bottom of the groove, and did not run out from the end of the V-shaped groove.

Example 10

A string-like sealing material the surface of which was non-tacky was produced in accordance with the following formulation having good dimensional stability without using any dimension-stabilizing aid.

| Thermosetting resin composition: | | (parts by weight) |
|---|---|---|
| ① | Ethylene-ethyl acrylate copolymer (product of Du Pont-Mitsui Polychemicals Co., Ltd., EEA A-715) | 100 parts |
| ② | Epoxy acrylate resin (product of Showa Highpolymer Co., Ltd., LIPOXY VR-77) | 2 parts |
| ③ | Silica (product of Nippon Aerosil Co., Ltd., Aerosil R-972) | 5 parts |
| ④ | Heat reaction initiator (product of Nippon Oil & Fats Co., Ltd., Perhexa 3M-40; organic peroxide) | 5 parts |

The above respective components were kneaded in a kneader to obtain a thermosetting resin composition. The thermosetting resin composition was fed to an extruder and melt-extruded at a resin temperature of 65° C. into string in the same manner as in Example 1. The thus-obtained string-like body having a diameter of 6 mm was used as a string-like sealing material. This string-like sealing material was not-tacky at the surface thereof.

The string-like sealing material thus obtained was substantially not elongated when a load to become stress of 5 N/cm$^2$ per unit sectional area was applied at 23° C. for 5 minutes to the string-like sealing material in the lengthwise direction thereof. When the same load was applied for 10 minutes, the elongation percentage was lower than 1%. When a load to become stress of 30 N/cm$^2$ per unit sectional area was applied at 23° C. for 5 minutes to the string-like sealing material in the lengthwise direction thereof, the elongation percentage was within 10%. When the same load was applied for 10 minutes, however, the elongation percentage was increased to 15%. The string-like sealing material involved no particular disadvantage upon use and was able to be applied with good results. This string-like sealing material was used to conduct a test in the same manner as in Example 1 except that the heating conditions were changed to 160° C. for 30 minutes. The thermosetting resin composition filled the bottom of the groove, and did not run out from the end of the V-shaped groove.

Comparative Example 1

| Thermosetting resin composition: | (parts by weight) |
|---|---|
| ① Ethylene-vinyl acetate copolymer (product of Mitsui Petrochemical Industries, Ltd., EVA 45X) | 450 parts |
| ② Ethylene-vinyl acetate copolymer (product of Mitsui Petrochemical Industries, Ltd., EVA 310) | 450 parts |
| ③ Urethane acrylate resin (product of Sievel Hegner Co., Ltd., Acrossacritane 290) | 600 parts |
| ④ Talc (product of Nippon Talc Co., Ltd., Microace K-1) | 50 parts |
| ⑤ Heat reaction initiator (product of Nippon Oil & Fats Co., Ltd., Perhexa 3M-40) | 10 parts |

The above respective components were kneaded in a kneader to obtain a thermosetting resin composition. The thermosetting resin composition was melt-extruded by means of an extruder at a resin temperature of 60° C. into string having a diameter of 7 mm to obtain a string-like sealing material the surface of which was slightly tacky. When a load of 5 N/cm² was applied at 23° C. to this string-like sealing material in the lengthwise direction thereof, the sealing material was elongated with an elongation percentage exceeding 10%.

This string-like sealing material was cut into lengths of 14 cm and slightly stretched by hands. As a result, it was found that the length is increased, and so the dimensional stability is insufficient. This string-like sealing material was used to conduct a test in the same manner as in Example 1 except that the heating conditions were changed to 160° C. for 30 minutes. The thermosetting resin composition melt-flowed to fill the bottom of the V-shaped groove, but run out by about 0.5 cm from the groove having a length of 15 cm to cure there.

Comparative Example 2

A string-like sealing material was produced in the same manner as in Example 9 except that no heat reaction initiator was added, and evaluation was made similarly. The thermosetting resin composition filled the bottom of the groove. However, the thermosetting resin composition was observed running out from the end of the V-shaped groove.

INDUSTRIAL APPLICABILITY

According to the present invention, there are string-like sealing materials which are excellent in handling property, can be completely filled even into a narrow and deep groove part such as a V-shaped groove by heating them, are excellent in heat resistance, weather resistance, rust proofness and sealing property, and can form a sealed part in good shape.

In the string-like sealing materials according to the present invention, a material having dimensional stability to heat upon heat curing is used as a dimension-stabilizing aid, and it is composited with a thermosetting resin composition which melt-flows and cures by heat. Therefore, the string-like sealing materials can exhibit such marked action and effects as (1) the dimensional stability in the lengthwise direction can be ensured, (2) a resin component can be run even into a narrow application site to exhibit the sealing effect with certainty, (3) the sealed area does not become wider than the length of the dimension-stabilizing aid, and (4) the resin component is of the thermosetting type, and so the string-like sealing materials are excellent in heat resistance and durability.

In the present invention, the same excellent action and effect as described above can be exhibited without using any dimension-stabilizing aid by using a thermosetting resin composition excellent in dimensional stability. According to the present invention, a ratio of the thermosetting resin and the thermoplastic resin can be freely changed, so that curing speed, curing temperature, etc. can be easily preset. The surfaces of the string-like sealing materials according to the present invention may be made non-tacky in order to enhance application workability.

The string-like sealing materials according to the present invention can be suitably applied to a wide variety of fields such as automobiles•vehicles, ships, aircraft, buildings, civil engineering, and various kinds of machines and apparatus for the purpose of achieving watertightness, airtightness, etc.

The invention claimed is:

1. A string-like composite structure sealing material (b), comprising a dimension-stabilizing aid other than a metal wire arranged along the lengthwise direction of a string-like body (a), wherein
    (1) the string-like body is obtained by forming a thermosetting resin composition comprising a synthetic resin and a heat-curing agent,
    (2) the elongation percentage thereof is within 10% as measured by applying a load to become stress of 5 N/cm² per unit sectional area at 23° C. for 5 minutes to the string-like composite structure sealing material in the lengthwise direction thereof, and
    (3) the string-like body (a) has shape-retaining ability at normal temperature (5 to 35° C.), but melt-flows upon its heat curing,
        wherein the string-like composite structure sealing material (b) is selected from the group consisting of a string-like composite structure (b1) which comprises the dimension-stabilizing aid composed of a linear material and a layer of the thermosetting resin composition formed around the dimension-stabilizing aid, and a string-like composite structure (b2) which comprises a string-like body formed by melt extrusion of the thermosetting resin composition and the dimension-stabilizing aid composed of a linear material embedded within the surface of the string-like body, and
    wherein the thermosetting resin composition further comprises a filler in a proportion of 0.1 to 50 parts by weight per 100 parts by weight of the synthetic resin.

2. The string-like composite structure sealing material according to claim 1, wherein the synthetic resin comprises a thermosetting resin, a thermoplastic resin or a mixture thereof.

3. The string-like composite structure sealing material according to claim 2, wherein the thermosetting resin is at least one thermosetting resin selected from the group consisting of urethane (meth)acrylate resins, epoxy (meth)acrylate resins and epoxy resins.

4. The string-like composite structure sealing material according to claim 2, wherein the thermoplastic resin is at least one thermoplastic resin selected from the group consisting of ethylene-vinyl acetate copolymers, ethylene-ethyl acrylate copolymers, saturated polyester resins and polybutadiene.

5. The string-like composite structure sealing material according to claim 1, wherein the string-like body (a) has a non-tacky surface at normal temperature.

6. The string-like composite structure sealing material according to claim 1, wherein the string-like body (a) is such that the thermosetting resin composition forming the string-like body melt-flows and cures by heating it to a temperature within a range of 70 to 250° C. upon heat curing.

7. The string-like composite structure sealing material according to claim 1, wherein the dimension-stabilizing aid linear material is not melted or decomposed upon the heat curing of the string-like body (a).

8. A string-like composite structure sealing material (b), comprising a dimension-stabilizing aid other than a metal wire arranged along the lengthwise direction of a string-like body (a), wherein
   (1) the string-like body is obtained by forming a thermosetting resin composition comprising a synthetic resin and a heat-curing agent,
   (2) the elongation percentage thereof is within 10% as measured by applying a load to become stress of 5 N/cm$^2$ per unit sectional area at 23° C. for 5 minutes to the string-like composite structure sealing material in the lengthwise direction thereof, and
   (3) the string-like body (a) has shape-retaining ability at normal temperature (5 to 35° C.), but melt-flows upon its heat curing,
      wherein the string-like composite structure sealing material (b) is selected from the group consisting of a string-like composite structure (b1) which comprises the dimension-stabilizing aid composed of a linear material and a layer of the thermosetting resin composition formed around the dimension-stabilizing aid, and a string-like composite structure (b2) which comprises a string-like body formed by melt extrusion of the thermosetting resin composition and the dimension-stabilizing aid composed of a linear material embedded within the surface of the string-like body, and
      wherein the thermosetting resin composition comprises, as the synthetic resin, a thermosetting resin and a thermoplastic resin at a weight ratio of 0.5:99.5 to 95:5, and the heat-curing agent in a proportion of 0.01 to 15 parts by weight per 100 parts by weight of the synthetic resin.

9. The string-like composite structure sealing material according to claim 8, wherein the thermosetting resin is at least one thermosetting resin selected from the group consisting of urethane (meth)acrylate resins, epoxy (meth)acrylate resins and epoxy resins.

10. The string-like composite structure sealing material according to claim 8, wherein the thermoplastic resin is at least one thermoplastic resin selected from the group consisting of ethylene-vinyl acetate copolymers, ethylene-ethyl acrylate copolymers, saturated polyester resins and polybutadiene.

11. A string-like composite structure sealing material (b) according to claim 1, comprising a dimension-stabilizing aid other than a metal wire arranged along the lengthwise direction of a string-like body (a), wherein
   (1) the string-like body is obtained by forming a thermosetting resin composition comprising a synthetic resin and a heat-curing agent,
   (2) the elongation percentage thereof is within 10% as measured by applying a load to become stress of 5 N/cm$^2$ per unit sectional area at 23° C. for 5 minutes to the string-like composite structure sealing material in the lengthwise direction thereof, and
   (3) the string-like body (a) has shape-retaining ability at normal temperature (5 to 35° C.), but melt-flows upon its heat curing,
      wherein the string-like composite structure sealing material (b) is selected from the group consisting of a string-like composite structure (b1) which comprises the dimension-stabilizing aid composed of a linear material and a layer of the thermosetting resin composition formed around the dimension-stabilizing aid, and a string-like composite structure (b2) which comprises a string-like body formed by melt extrusion of the thermosetting resin composition and the dimension-stabilizing aid composed of a linear material embedded within the surface of the string-like body, and
      wherein the string-like body is obtained by forming a thermosetting resin composition comprising an organic peroxide as the heat-curing agent in a proportion of 0.01 to 15 parts by weight per 100 parts by weight of at least one thermoplastic resin, as the synthetic resin, selected from the group consisting of ethylene-vinyl acetate copolymers and ethylene-ethyl acrylate copolymers.

* * * * *